United States Patent
Nörgaard

(10) Patent No.: US 7,229,347 B2
(45) Date of Patent: Jun. 12, 2007

(54) METHOD AND APPARATUS FOR BONE REMOVAL

(75) Inventor: Thomas Kidde Nörgaard, Hjörring (DK)

(73) Assignees: Carnitech A/S, Stoevring (DK); Marel HF, Gardabaer (IS)

( * ) Notice: Subject to any disclaimer, the term of this patent is extended or adjusted under 35 U.S.C. 154(b) by 226 days.

(21) Appl. No.: 10/511,469

(22) PCT Filed: Apr. 22, 2003

(86) PCT No.: PCT/IS03/00017

§ 371 (c)(1),
(2), (4) Date: Oct. 18, 2004

(87) PCT Pub. No.: WO2004/049811

PCT Pub. Date: Jun. 17, 2004

(65) Prior Publication Data

US 2006/0172675 A1 Aug. 3, 2006

(30) Foreign Application Priority Data

Apr. 19, 2002 (IS) .......................................... 6354

(51) Int. Cl.
*A22C 17/02* (2006.01)
(52) U.S. Cl. ...................................................... 452/135
(58) Field of Classification Search .................... None
See application file for complete search history.

(56) References Cited

FOREIGN PATENT DOCUMENTS

| DE | 26 41 427 A | 5/1977 |
|---|---|---|
| WO | WO 99 52375 A | 10/1999 |
| WO | WO 01 43553 A | 6/2001 |

*Primary Examiner*—Thomas Price
(74) *Attorney, Agent, or Firm*—Foley & Lardner LLP

(57) ABSTRACT

An apparatus for removal bones from a fish fillet is presented. A conveyor is provided for conveying the fish fillet and supporting means is arranged on said conveyor for supporting the fish fillet as it is being conveyed by means of imposing the fish fillet on it so that the bones to be removed are exposed. A second supporting means is arranged sidewise to said first supporting means for maintaining the fish fillet in a fixed position as the exposed bones are removed with a bone removal unit, which is arranged above the conveying means.

11 Claims, 5 Drawing Sheets

METHOD AND APPARATUS FOR BONE REMOVAL

FIELD OF THE INVENTION

Figure 1:
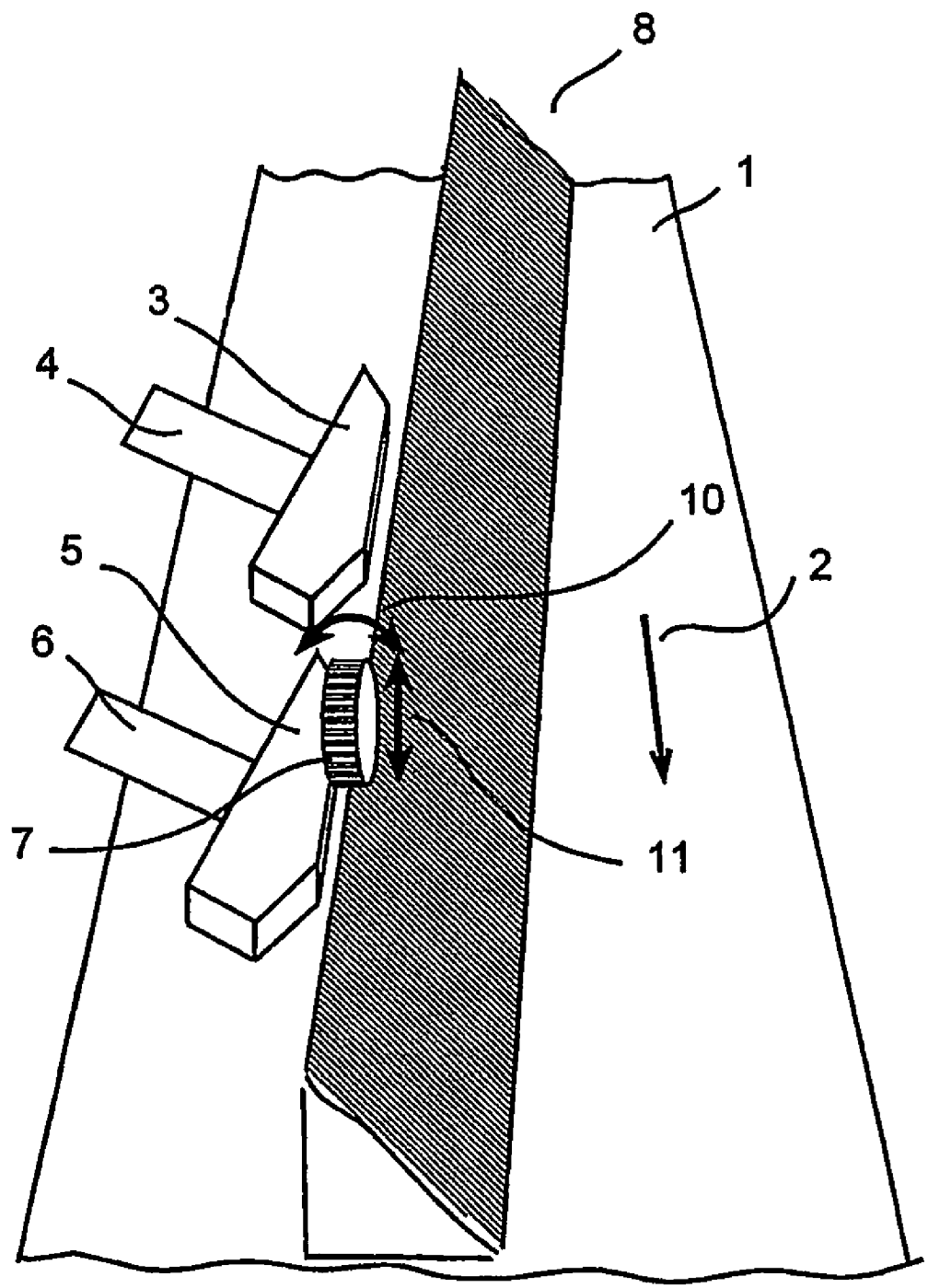

The present invention relates to an improved apparatus and method for removal bones from a fish fillet.

BACKGROUND

One of the main concerns for fish processors is unwanted bones in fish fillet, such as whitefish in particular cod. Beside that such bones make the fish product less attractive it can have devastating effect if they are swallowed. This can have negative publicity, which may lower the value of the product. Therefore it should not surprise anyone that fish producers all over the world spent much effort in finding bones and removal them. This is and been very labour consuming operation, where some of the bones are difficult to find and to remove. In some cases a part of the fish fillet must be removed due to difficulties in removal the bones.

Apparatus for processing fish exist. In U.S. Pat. No. 5,525,101 a device is described for removal bones from fish meat. This device is however hand-held device, which means that the processing in operating the fish product is mainly controlled by the worker. Further this it is a demanding job to hold the device in hand with its electrical power supply. As the device is hand-held the possibilities to automate the process are very limited.

From a Danish utility Model DK 1999 00226 U4 an apparatus is presented for bone removal, where the apparatus is hinged to a frame above a conveyor. The bone-removal unit is then elevated semi- or fully automatically toward the upwardly facing surface of the fish filets and driven over the entire surface. The problem with this method is that the entire surface is brought into contact with the bone-removal unit, which can damage the fish fillet.

An improved apparatus and method for removal bones is presented in WO 01/43553, that comprises a conveyor and a bone-removal unit hinged above the conveyor, where the bone removal unit is movable in an approximated up-and downward direction toward the conveyor. The conveyor comprises an upwardly extending edge and a plurality of elevating means forming a horizontal support for the fish fillet there in-between for elevating a particular area of the fillet. On the outside of said elevating means a pressure means or device is provided to maintain the fish in a fixed position. The bones are removed by bringing the removal units into contact to that particular area to that are primarily located in the horizontal surface.

The main problem in WO 01/43653 is that the bones to be removed are not sufficiently exposed because of the horizontal support for the bone-removal unit, which may result in that some bones are left in the fish after the processing. Also, the movement of the bone-removal unit is limited to only up-and downward movement, and therefore bones that are not in the plane of the bone removal unit remain in the fish fillet. Further, the pressure means that is provided for maintaining the fish fillet in a fixed position may be reduced to the interval where the bones removal procedure is running, which would simplify the apparatus significantly.

DESCRIPTION OF THE INVENTION

The object of the present invention is to provide an improved apparatus and a method for removal bones from a fish fillet in a more effective manner; and therefore increasing the value of these products.

According to the first aspect, the present invention relates to an apparatus for removing bones from a fish fillet, said bones being primarily located in an area along a line corresponding to the spine of the fish, said apparatus comprising:

a supporting frame, a conveyor arranged on said frame for conveying the fish fillet, a first supporting means arranged on said conveyor for supporting the fish fillet as it is being conveyed by means of imposing the fish fillet on it so that the bones to be removed are exposed, a bone removal unit arranged on said frame in an area above the conveying means, a second supporting means arranged sidewise to said first supporting means, and means for providing an attractive force between said first- and said second supporting means, said first- and second supporting means further defining a gap there in-between enveloping at least portion of the fish fillet and maintaining the same in fixed position during the bone removal process, said gap representing the fillet thickness at a particular area and thereby providing guidance for positioning of said bone removal unit.

In a preferred embodiment the first supporting means is made of plurality of triangular formed units arranged parallel on the conveyor with one side perpendicular to the conveyor and parallel to the conveying movement and one side as inclined side. By arranging a plurality of such units a triangular shape closed loop with one side perpendicular to the conveyor is formed. The second supporting means is at least one member positioned in a proximity to the upper part of said first supporting means such that in a rest position one side of said member is arranged parallel to said perpendicular side along the conveyor. The number of such beams may be one, two or even more arranged along the conveyor. Accordingly, the advantage from arranging more than one second supporting means along the conveyor is improve the accurate adjustment of the loin piece size within the within the same fillet. This ensures an accurate orientation of the bones of the fish fillet.

The depth between the first and the second supporting means is preferably adjustable, such as by providing one or more rotatable beams with one end mounted to an axel on the second supporting means or adjacent to it, and the other end facing the perpendicular side of the first supporting means. The interval between the first and the second supporting means is defined through the width of said beams as a loin side of a fish fillet is forced there in-between. Accordingly, the rotatable beams follow the with of the interval, thereby moving thin loin side upwards and therefore exposing the bones to be removed and lie parallel to the conveyor plane when the loins side is thick. The attractive force between said first and said second supporting means can be arranged in different way, such as by means of mounting one or preferably a number of springs between the second supporting means and a position adjacent to the perpendicular side of the first supporting means. This attractive force may therefore be described through Hooke's law. This beam may have a wing formed cross sectional shape with the broader end mounted to the second supporting means and the narrower end facing the perpendicular side of the first supporting means.

The bone-removal unit comprises in one preferred embodiment a rotatably driven axle with engagement elements or teeth and a counter pressure element for interacting with the engagements elements. Further, the movement of the bone-removal unit comprises a two or three-dimensional movement with the aim of covering said area along the line corresponding to the spine of the fish, whereby the movement of the bone-removal unit may be defined by the gap size between the first and the second supporting means. The movement can be done by the use of a servo motor. The bone removal unit may also be moved in a predefined way, independent of the thickness of the loin side. One preferred embodiment of the functionality of the apparatus is explained in the following example:

EXAMPLE

The number of second supporting means is two, arranged sidewise and along the conveyor. In the absence of a fish fillet, both the first and the second supporting means lie adjacent to the perpendicular side of the first supporting means. In this position the bone-removal unit is in a first position above and close to the first and the second supporting means. The fish fillet is transported on the first supporting means, such that the bones that are being primarily located in an area along a line corresponding to the spine of the fish are exposed and the loin sides lies downwards the inclined and the vertical sides. As the fish fillet arrives the first of the two members, the member is displaced outwardly and forms therefore a pocket for one loin side. This pocket is therefore adjusted to actual fillet size by pressing this first member against the loin piece lying in the pocket. Further, the loin piece that is thin is pulled upwards through the rotatable beam, i.e. the bottom of the pocket is moved upwards for exposing it further. As the fish fillet is transferred the outwardly displacement continues with increasing loin side thickness. Here, the bone-removal unit receives a signal that a fish fillet is present. The volume of the pocket (the outwardly displacement) is used as a guidance for positioning of said bone removal unit, which moves upwards in a height corresponding to the height of the spine of the fish and starts the bone removal procedure. Further the movement comprises pivotally movement with the aim of covering the boning area of the fish fillet. This procedure is repeated for the subsequent fish fillet.

According to the second aspect, the present invention relates to a method for removal bones from a fish fillet, said bones being primarily located in an area along a line corresponding to the spine of the fish, said method comprising:

positioning the fish fillet on a first supporting means in a way so that the bones to be removed are exposed and subsequently conveying the fish fillet, providing a second supporting means arranged sidewise to said first supporting means, providing an attractive force between said first- and said second supporting means and therefore maintaining the fish fillet in a steady position, and removal said exposed bones by means of bringing a bone removal unit in contact with the surface of said steady fish fillet in the exposed area where the bones are primarily located in.

DETAILED DESCRIPTION

Figure 2:
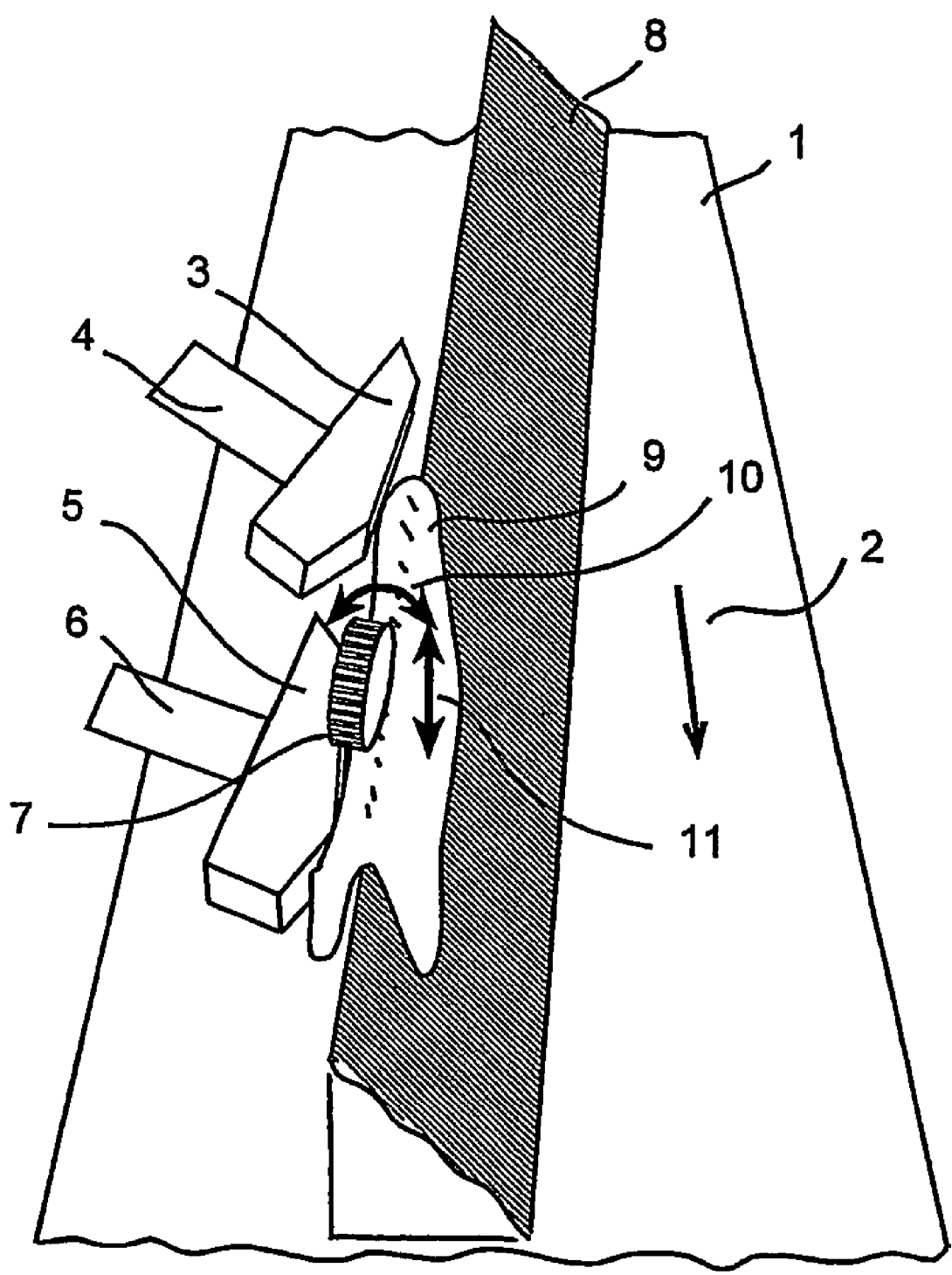
Figure 4A:
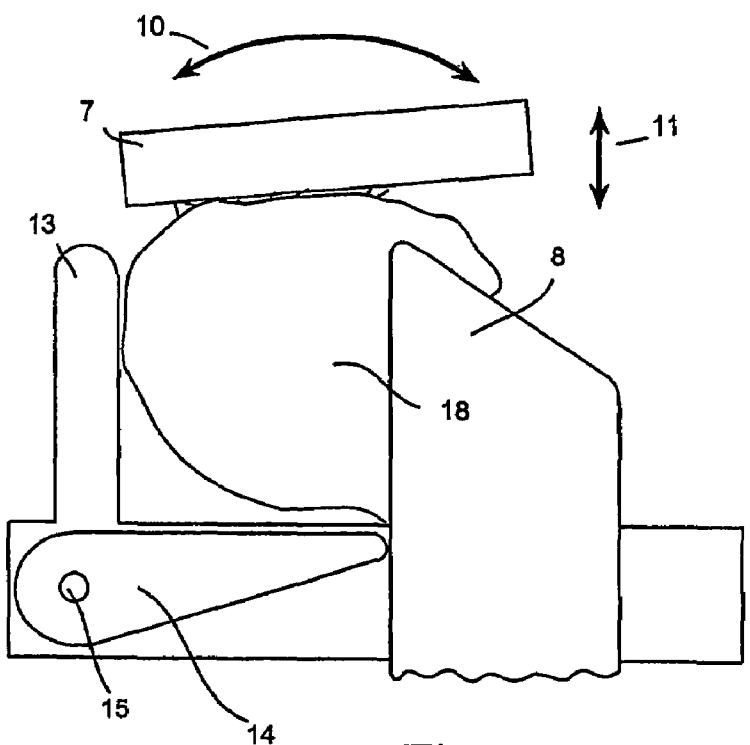
Figure 5:
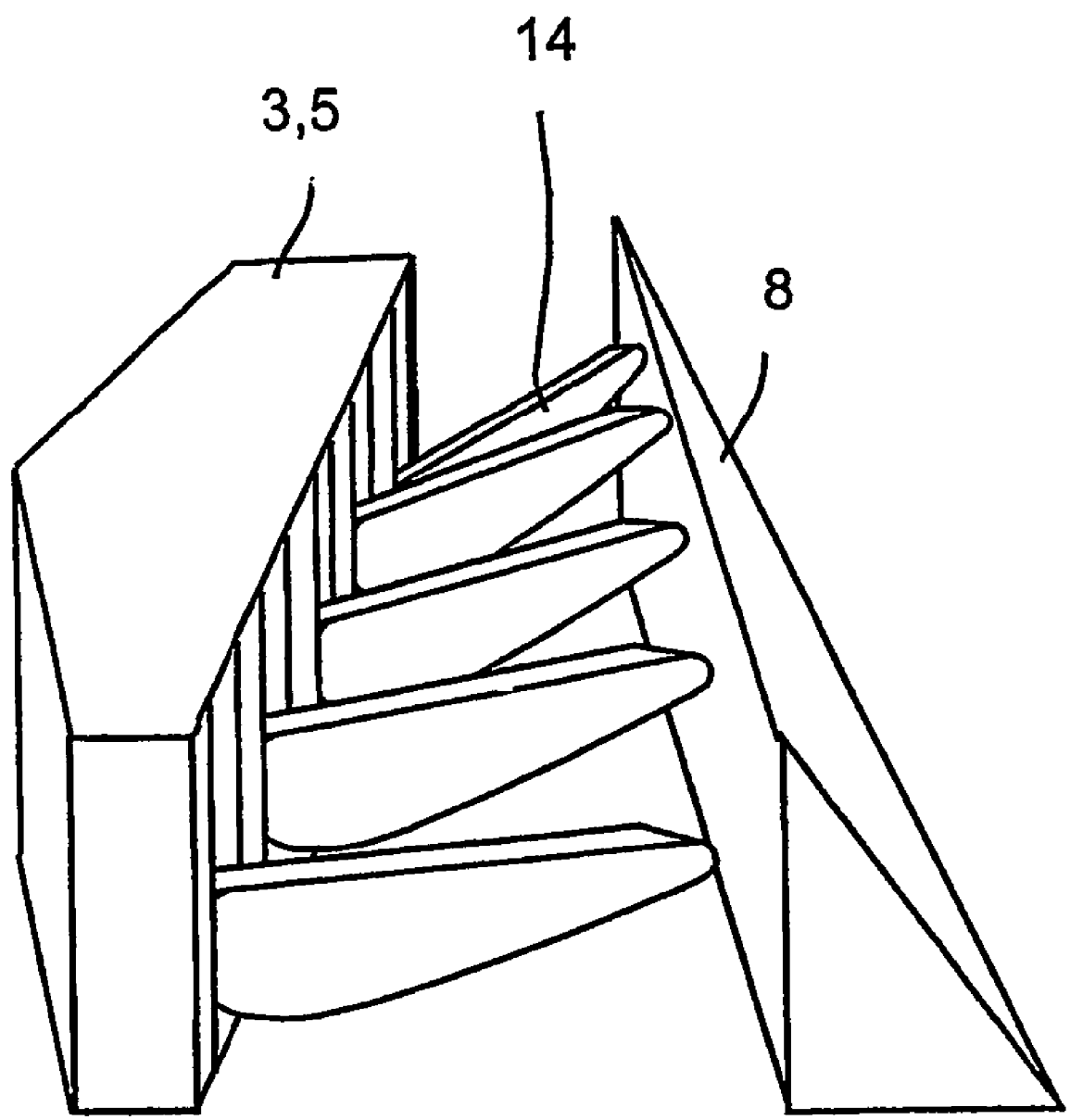

In the following the present invention, and in particular preferred embodiments thereof, will be described in greater details in connection with the accompanying drawings in which, FIG. 1 shows an overview of an apparatus for removal bones from a fish fillet in the absence of a fish fillet, FIG. 2 shows an overview of an apparatus for removal bones from a fish fillet in the presence of a fish fillet, FIGS. 3a) and b) shows a perspective view of a first and a second supporting means in a first and a second position in the absence of a fish fillet, FIGS. 4a) and b) shows a perspective view of a first and a second supporting means in a first and a second position in the presence of a fish fillet, and FIG. 5 shows one of the two members with a plurality of beams.

FIG. 1 shows an overview of an apparatus for removing bones from a fish fillet in the absence of a fish fillet, comprising a conveyor 1 moving in a direction indicated by the arrow 2, a plurality of triangular formed units 8 arranged parallel on the conveyor moving therefore with the conveyor, a first and a second member 3, 5 arranged adjacent to said units 8 and the bone removal unit 7 positioned above the units 8 and the members 3, 5. In one embodiment the bone removing unit comprises a rotatably driven axel with an engagement element or teeth, and a counter pressure element. Accordingly, the bone removing procedure comprises intercepting the bones between the counter pressure element and the engagement element and thereby pulling it out of the fish fillet.

In the position in the absence of fish fillet the two members are arranged adjacent to the perpendicular side of the units 8. The space between the members 3, 5 and the units 8 form a pocket, which in this position is negligible. An attractive force between the members and the units 8 causes that in the absence of a fish fillet the members 3, 5 lie adjacent to the perpendicular side of the units 8. This force may be provided in a different way, such as mounting one or preferably a number of springs between the members and a position adjacent to the perpendicular side of the units (not shown). Two supporting arms 4, 6 maintain the two beams 3, 5 in a stationary position but allow the beams to be displaced from this initial position in the presence of a fish fillet. The bone-removal unit 7 is displaceable up-and downwardly 11 as well as pivotally 10, as indicated by the arrows.

In FIG. 2 a fish fillet 9 is being transferred on the triangular formed units 8, which act as a first supporting means for the fish fillet with the conveyor speed indicated by the arrow. This shape of the units 8 has the advantage that the bones to be removed are exposed. Here the loin piece of the fish fillet is in between the first and the second members 3, 5 and the perpendicular side of the units 8. The first member 3 has in the plane of the conveyor an inclined position, which is controlled by the thickness of the loin side of the fish fillet as well as the position in between the members and the units. Where the loin side covers the interval between the second member 5 and the units 8, the member 5 is displaced outwardly with increasing loin side thickness. Accordingly, a pocket between the member and the units is defined. The displacement volume of this pocket can be used as guidance for positioning of said bone removal unit in a suitable height, wherein subsequently, the bone removal procedure starts.

Figure 3A:
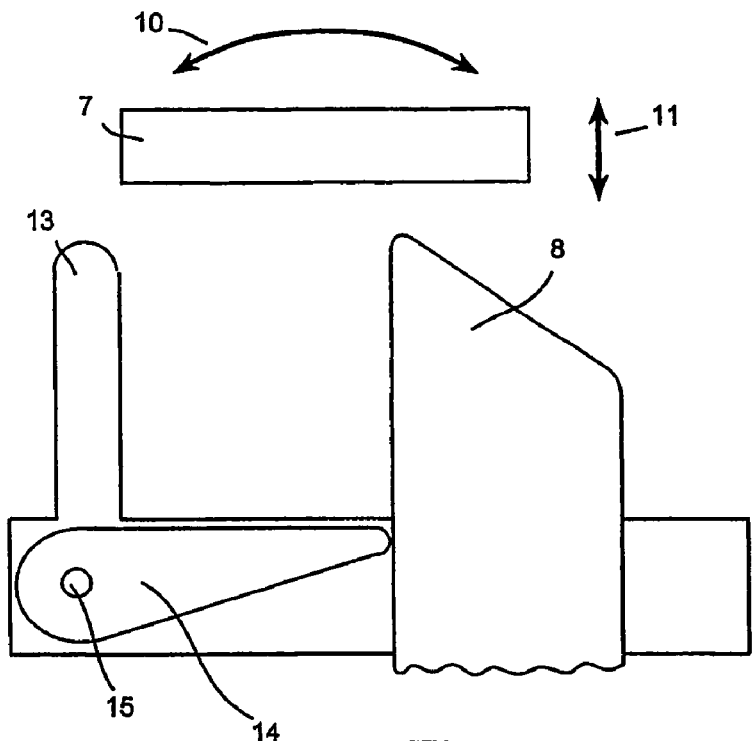
Figure 3B:
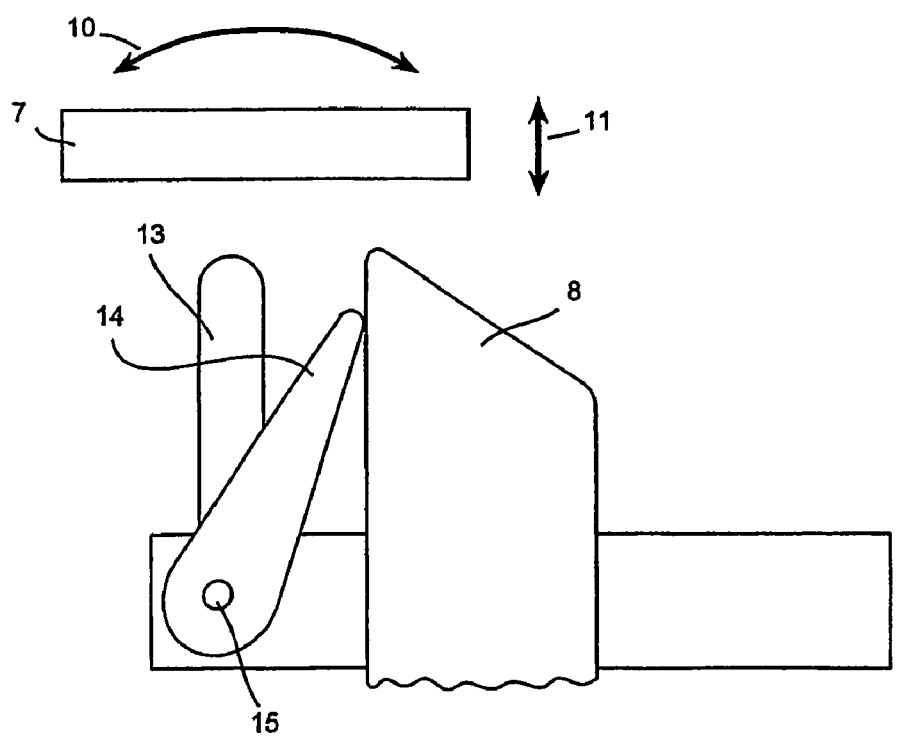
Figure 4B:
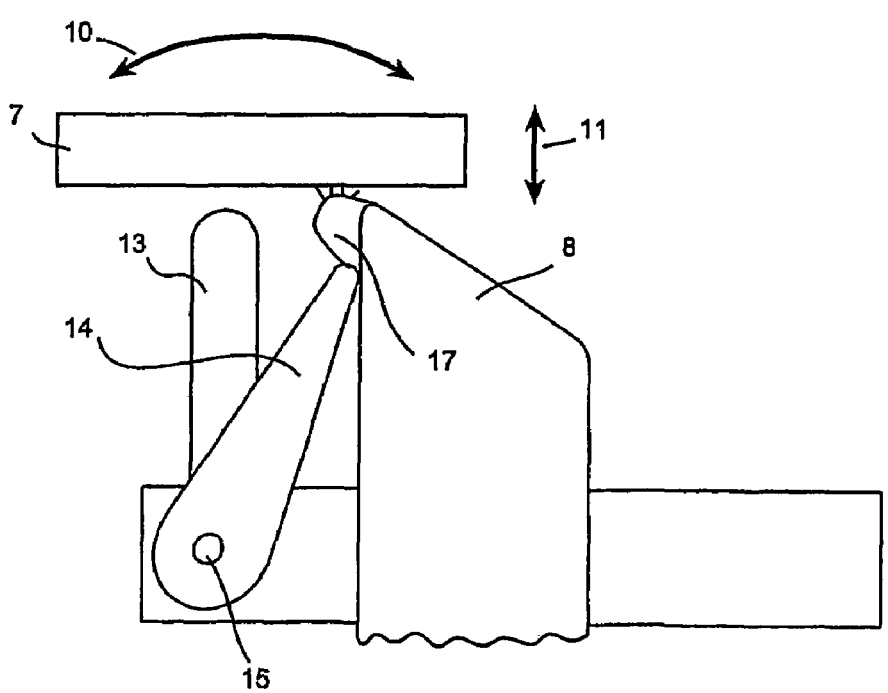

FIGS. 3a) and b) show a perspective view of a first and a second supporting means in a first and a second position in the absence of a fish fillet. Shown is also a rotatable beam with a wing formed cross sectional shape with the broader end mounted to the member 3, 5 and the narrower end facing the perpendicular side of the first supporting means. This beam defines the bottom of the pocket. Therefore the pocket or the interval defined through the thickness of the loin side of the fish fillet may be extended or contracted wherein said beam follows said positions. In FIG. 3a) the pocket is in a expanded position and in FIG. 3b) the pocket is in a contracted position. As shown, the beam 14 follows said positions. This is done by providing the beam or the axel on which the beam is mounted to with a rotational force for followings said positions. This has the advantage that when a loin side of the fish fillet is thin, it is pressed upwards by the beam 14. This is illustrated more clearly in FIGS. 4a) and 4b) where the loin side of the fish fillet is shown 17, 18, that define the pocket between the members and the units 18. In FIG. 4a), the loin side is thick and in FIG. 4b) it is thin and pressed upwards to expose the bones to be removed. Otherwise, those bones would not be accessible for the bone-removal unit 7. Further, FIGS. 3 and 4 illustrate the movement of the bone-removal unit 7. The height 11 is adjustable and preferably controllable as well as the pivot movement 10 of the bone-removal unit for enabling to remove the bones along the contour lines of the surface of the fish.

FIG. 5 shows one of the two members with a plurality of beams, that define the bottom of the pocket formed between the members 3,5 and the perpendicular side of the units 8. According to FIG. 5, the positions of the beams that are inclines versus the beams that are arranged parallel reflect as mentioned earlier the thickness of the loin side of the fish fillet. The inclined beams are the beams where the loin side is thin and the parallel arranged beams where the loin side is thick. The result of these different positions of the beams is that the bones to be removed are exposed are positioned in with the correct height independent of the thickness of the loin side.

The invention claimed is:

1. An apparatus for removing bones from a fish fillet, said bones being primarily located in an area along a line corresponding to the spine of the fish, said apparatus comprising:
   a supporting frame,
   a conveyor arranged on said frame for conveying said fish fillet,
   at least one support member arranged on said conveyor for supporting said fish fillet as it is being conveyed, wherein said fish fillet is imposed on said support member so that the bones to be removed are exposed,
   a bone removal unit arranged on said frame in an area above the conveying means,
   at least one guide arranged adjacent to said support member, and
   at least one spring for providing an attractive force between said support member and said guide,
   wherein said support member and said guide further define a gap between them that envelops at least a portion of the fish fillet and maintains the fish fillet in a fixed position during the bone removal process, and
   wherein said gap corresponds to a thickness of said fish fillet so as to position said bone removal unit.

2. An apparatus according to claim 1, wherein at least two support members are arranged in parallel along the entire conveyor, wherein one side of each the support members is perpendicular to the surface of the conveyor.

3. An apparatus according to claim 2, wherein said guide is positioned in proximity to the upper part of each of said support members such that in a rest position one side of said guide is arranged in parallel to said side of said support members that is perpendicular to the surface of the conveyor.

4. An apparatus according to claim 1, wherein two support members are arranged adjacent to each other along the conveyor.

5. An apparatus according to claim 1, further comprising at least one rotatable beam for defining the depth of said gap in correspondence with the width of said gap.

6. An apparatus according to claim 5, wherein said rotatable beam has one end mounted to an axel on said guide or adjacent to said guide and another end facing said perpendicular side of the support member such that the second end of the rotatable beam is displaced upwards and downwards as said gap is extended or contracted, wherein the depth of the gap is increased or decreased.

7. An apparatus according claim 5, wherein said rotatable beam has a wing-shaped cross section with the broader end mounted to the guide and the narrower end facing the perpendicular side of the support member.

8. An apparatus according to claim 1, wherein the bone-removal unit is configured to execute two and/or three-dimensional movement such that the bone-removal unit is capable of accessing said area along the line corresponding to the spine of the fish.

9. An apparatus according to claim 1, wherein the gap size is used to position said bone-removal unit.

10. An apparatus according to claim 1, wherein said bone-removal unit comprises a rotatably driven axel with an engagement element and a counter pressure element.

11. A method for removing bones from a fish fillet, wherein said bones are primarily located in an area along a line corresponding to the spine of the fish, said method comprising the steps of:
   separating at least one supporting member and at least one guide from each other to form a pocket for holding the fish fillet;
   placing said fish fillet between said supporting member and said guide, such that said bones are exposed;
   applying attractive force between said supporting member and said guide, such that said fish fillet is enveloped and held in place by said supporting member and said guide;
   conveying said fish fillet to a de-boning area; and
   de-boning said fish fillet.

* * * * *